United States Patent
Peng

(10) Patent No.: US 12,341,221 B2
(45) Date of Patent: *Jun. 24, 2025

(54) BATTERY AND PORTABLE ELECTRICAL DEVICE

(71) Applicant: Zhuhai CosMX Battery Co., Ltd., Zhuhai (CN)

(72) Inventor: Ning Peng, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,772

(22) Filed: Nov. 16, 2023

(65) Prior Publication Data
US 2024/0088527 A1    Mar. 14, 2024

Related U.S. Application Data

(63) Continuation of application No. 17/028,344, filed on Sep. 22, 2020, now Pat. No. 11,824,227.

(30) Foreign Application Priority Data

Jun. 19, 2020  (CN) .......................... 202010567298.X

(51) Int. Cl.
*H01M 50/531*  (2021.01)
*H01M 10/04*  (2006.01)

(52) U.S. Cl.
CPC ....... *H01M 50/531* (2021.01); *H01M 10/049* (2013.01); *H01M 2220/30* (2013.01)

(58) Field of Classification Search
CPC ............. H01M 50/531; H01M 10/049; H01M 2220/30; B23K 26/22; B23K 26/244
See application file for complete search history.

(56) References Cited

U.S. PATENT DOCUMENTS 11,824,227 B2 * 11/2023 Peng .................. B23K 26/26
2009/0152245 A1   6/2009 Wang et al.
(Continued)

FOREIGN PATENT DOCUMENTS

CN        202094205 U      12/2011
CN        203481318 U       3/2014
(Continued)

OTHER PUBLICATIONS

European Search Report for Application No. 20199282.3, dated Mar. 17, 2021, 10 pages.
(Continued)

*Primary Examiner* — Matthew T Martin
*Assistant Examiner* — Bartholomew A Hornsby
(74) *Attorney, Agent, or Firm* — DILWORTH IP, LLC

(57) ABSTRACT

The present disclosure provides a battery and a portable electrical device. The battery includes a housing and a battery cell disposed in the housing; the battery cell includes electrodes and tabs, where the electrode includes a current collector and an active material layer, and the current collector includes a coating zone coated and an empty foil zone, and an end of the tab is welded to the empty foil zone by a laser welding process; a surface of the empty foil zone facing away from the tab has a plurality of welding zones arranged at intervals, and each welding zone comprises at least one line-shaped welding mark and a surface of the tab facing away from the empty foil zone has no welding mark. The protrusion of the present disclosure is less likely to pierce a separator between a positive electrode and a negative electrode.

3 Claims, 4 Drawing Sheets

(56) References Cited

U.S. PATENT DOCUMENTS

| | | |
|---|---|---|
| 2009/0223940 A1 | 9/2009 | Hosoya |
| 2016/0114429 A1 | 4/2016 | Shioga et al. |
| 2018/0358608 A1 | 12/2018 | Mino |
| 2019/0123313 A1 | 4/2019 | Guo et al. |
| 2019/0173293 A1 | 6/2019 | Matsumoto |
| 2019/0329353 A1 | 10/2019 | Dai et al. |
| 2020/0168885 A1 | 5/2020 | Lee et al. |
| 2021/0252638 A1 | 8/2021 | Roh et al. |
| 2022/0352540 A1 | 11/2022 | Chen et al. |

FOREIGN PATENT DOCUMENTS

| | | | | |
|---|---|---|---|---|
| CN | 105591062 A | | 5/2016 | |
| CN | 105990612 A | | 10/2016 | |
| CN | 106328984 A | * | 1/2017 | ........ H01M 10/0525 |
| CN | 108475756 A | | 8/2018 | |
| CN | 207868261 U | | 9/2018 | |
| CN | 209822770 U | | 12/2019 | |
| CN | 110731024 A | | 1/2020 | |
| DE | 102013015710 A1 | | 7/2014 | |
| EP | 3648199 A1 | | 5/2020 | |
| WO | 2019177081 A1 | | 9/2019 | |

OTHER PUBLICATIONS

Abhishek Das et al: "Joining Technologies for Automotive Battery Systems Manufacturing", World Electric Vehicle Journal, vol. 9, No. 2, Jul. 5, 2018 (Jul. 5, 2018), 13 pages, XP055725546, DOI: 10.3390/wevj9020022.

Mesko Jozef et al: "Microstructure Analysis of Welded Joints after Laser Welding", Manufacturing Technology : Journal for Science, Research and Production, vol. 14, No. 3, Oct. 1, 2014 (Oct. 1, 2014), pp. 355-359.

First Office Action in CN Patent Application No. 202010567298.X dated Mar. 3, 2022.

Walsh,C.A., Laser Welding—Literature Review, Materials Science and Metallurgy Department, University of Cambridge, England, Jul. 2002, pp. 1-21.

* cited by examiner

BATTERY AND PORTABLE ELECTRICAL DEVICE

CROSS-REFERENCE TO RELATED APPLICATION

This application is a continuation of U.S. patent application Ser. No. 17/028,344, filed on Sep. 22, 2020, which claims priority to Chinese Patent Application No. 202010567298.X, filed on Jun. 19, 2020. The disclosures of the above applications are hereby incorporated by reference in their entireties.

TECHNICAL FIELD

The present disclosure relates to the technical field of lithium batteries and, in particular, to a battery and a portable electrical device.

BACKGROUND

Portable electrical devices such as mobile phones, wearable devices and computers have become indispensable mobile terminals in people's daily life. As it is well-known, use of mobile terminals is inseparable from batteries. Existing batteries include lead storage batteries, lithium batteries and other types, where lithium-ion batteries have become the first choice for all kinds of portable electrical devices due to its advantages of high energy density and environmental friendliness.

Due to the fact that the portable electrical devices are closely related to people's daily life, safety performance of the portable electrical devices has become a focus of public attention, especially the safety performance of the lithium-ion batteries installed inside the portable electrical devices.

At present, electrodes and tabs of a lithium-ion battery are welded together by ultrasonic waves. However, needle-shaped welding protrusions may be formed on the electrode side after ultrasonic welding, and the needle-shaped welding protrusions may easily pierce a separator between the positive electrode and the negative electrode, resulting in short-circuit contact between the positive electrode and the negative electrode, which may cause serious safety problems.

SUMMARY

The present disclosure provides a battery and a portable electrical device, where a separator between a positive electrode and a negative electrode is less likely to be pierced by protrusions formed after electrodes and tabs of the battery are welded, so that a short circuit could be prevented, thereby being beneficial to the improvement of the quality and safety performance of the battery.

In a first aspect, the present disclosure provides a battery, which includes a housing and a battery cell disposed in the housing; the battery cell includes electrodes and tabs, and each of the electrodes is integrally connected with a tab, where each of the electrodes includes a current collector and an active material layer, and the current collector includes a coating zone coated with the active material layer and an empty foil zone not coated with the active material layer, and an end of the tab is welded to the empty foil zone by a laser welding process; a surface of the empty foil zone facing away from the tab has a plurality of welding zones which are arranged at intervals, and each of the welding zones includes at least one line-shaped welding mark; a surface of the tab facing away from the empty foil zone has no welding mark.

The battery in the present disclosure includes a housing and a battery cell disposed in the housing, the battery cell includes electrodes and tabs, and each of the electrodes is integrally connected with a tab, where each of the electrodes includes a current collector and an active material layer, the current collector includes a coating zone coated with the active material layer and an empty foil zone not coated with the active material layer, and an end of the tab is welded to the empty foil zone of the electrode by a laser welding process, which could, on the one hand, avoid the occurrence of the phenomenon that the performance of the battery is influenced by pseudo welding or over welding caused by welding head wear during the ultrasonic welding, and on the other hand, save the work of replacing the welding head and thus reduce the workload of staffs. After the laser welding has been completed, the surface of the empty foil zone of the electrode facing away from the tab has a plurality of welding zones arranged at intervals, and each of the welding zones includes at least one line-shaped welding mark. Since a contact area between the line-shaped welding mark and a separator is larger than that between a needle-shaped welding protrusion and a separator in the prior art, pressure between the line-shaped welding mark and the separator is lower, and thus the line-shaped welding mark is less likely to pierce the separator between the positive electrode and the negative electrode, thereby preventing a short circuit between the positive electrode and the negative electrode and then being beneficial to the improvement the quality and safety performance of the battery. Furthermore, the surface of the tab facing away from the empty foil zone has no welding mark, that is, the original flatness of the tab could be maintained unchanged through the surface of the tab facing away from the empty foil zone during the welding process, and therefore the surface of the tab facing away from the empty foil zone could be prevented from forming an unfavorable structure to the separator during the welding process, which is beneficial to the improvement of the quality and reliability of the battery.

As for the battery described above, optionally, a height of the line-shaped welding mark is within 30 μm.

As for the battery described above, optionally, a ratio of the height of the line-shaped welding mark to a width of the line-shaped welding mark is less than 1.

As for the battery described above, optionally, the width of the line-shaped welding mark is larger than 50 μm.

As for the battery described above, optionally, the welding zone includes at least two line-shaped welding marks which are disposed in parallel with each other, and a distance between adjacent two line-shaped welding marks is larger than 50 μm.

As for the battery described above, optionally, the welding zone includes at least two line-shaped welding marks, and the at least two line-shaped welding marks are disposed to cross with each other.

As for the battery described above, optionally, the plurality of welding zones are arranged in an array; and/or, a minimum distance between the line-shaped welding mark and the coating zone is larger than 1 mm; and/or, the empty foil zone is located in the middle of the electrode.

In a second aspect, the present disclosure provides a method for manufacturing a battery, where the battery includes a housing and a battery cell, and the battery cell includes electrodes and tabs, and the method includes: for each pair of an electrode and a tab, overlapping an end of the tab with an empty foil zone of the electrode; performing, by using a laser welding device, continuous welding on a surface of the empty foil zone facing away from the tab multiple times, a line-shaped welding mark being formed by the continuous welding of the laser welding device each time, a plurality of the line-shaped welding marks being located in a plurality of welding zones arranged at intervals, so that each of the welding zones includes at least one line-shaped welding mark; a surface of the tab facing away from the empty foil zone having no welding mark; processing the electrode welded with the tab and a separator together to form the battery cell; and assembling the battery cell into the housing to form the battery.

The method for manufacturing a battery cell in the present disclosure, where the battery includes a housing and a battery cell, and the battery cell includes electrodes and tabs, and the method includes: for each pair of an electrode and a tab, overlapping an end of the tab with an empty foil zone of the electrode; performing, by using a laser welding device, continuous welding on a surface of the empty foil zone facing away from the tab multiple times. Adopting the laser welding process could, on the one hand, avoid the occurrence of the phenomenon that the performance of the battery is influenced by pseudo welding or over welding caused by welding head wear during the ultrasonic welding, and on the other hand, save the work of replacing the welding head and thus reduce the workload of staffs. A line-shaped welding mark is formed by the continuous welding of the laser welding device each time, and a plurality of the line-shaped welding marks are located in a plurality of welding zones arranged at intervals, so that each of the welding zones includes at least one line-shaped welding mark. Since a contact area between the line-shaped welding mark and a separator is larger than that between a needle-shaped welding protrusion and a separator in the prior art, pressure between the line-shaped welding mark and the separator is lower, and thus the line-shaped welding mark is less likely to pierce the separator between the positive electrode and the negative electrode, thereby preventing a short circuit between the positive electrode and the negative electrode, and then being beneficial to the improvement of the quality and safety performance of the battery. Furthermore, the surface of the tab facing away from the empty foil zone has no welding mark, that is, the original flatness of the tab could be maintained unchanged through the surface of the tab facing away from the empty foil zone during the welding process, and therefore the surface of the tab facing away from the empty foil zone could be prevented from forming an unfavorable structure to the separator during the welding process, which is beneficial to the improvement of the quality and reliability of the battery.

In a third aspect, the present disclosure provides a portable electrical device, including the battery as described in any one of the above.

The portable electrical device in the present disclosure includes a battery, where the battery includes a housing and a battery cell disposed in the housing, the battery cell includes electrodes and tabs, and each of the electrodes is integrally connected with a tab; each of the electrode includes a current collector and an active material layer, and the current collector includes a coating zone coated with the active material layer and an empty foil zone not coated with the active material layer, and an end of the tab is welded to the empty foil zone of the electrode through a laser welding process, which could, on the one hand, avoid the occurrence of the phenomenon that the performance of the battery is influenced by pseudo welding or over welding caused by welding head wear during the ultrasonic welding, and on the other hand, save the work of replacing the welding head and thus reduce the workload of staffs. After the laser welding has been completed, the surface of the empty foil zone of the electrode facing away from the tab has a plurality of welding zones arranged at intervals, and each of the welding zones includes at least one line-shaped welding mark. Since a contact area between the line-shaped welding mark and a separator is larger than that between a needle-shaped welding protrusion and a separator in the prior art, the pressure between the line-shaped welding mark and the separator is lower, and thus the line-shaped welding mark is less likely to pierce the separator between the positive electrode and the negative electrode, thereby preventing a short circuit between the positive electrode and the negative electrode and then being beneficial to the improvement of the quality and safety performance of the battery. Furthermore, the surface of the tab facing away from the empty foil zone has no welding mark, that is, the original flatness of the tab could be maintained unchanged through the surface of the tab facing away from the empty foil zone during the welding process, and therefore the surface of the tab facing away from the empty foil zone may be prevented from forming an unfavorable structure to the separator during the welding process, which is beneficial to the improvement of the quality and reliability of the battery.

As for the portable electrical device described above, in an embodiment, the portable electrical device includes a mobile terminal.

BRIEF DESCRIPTION OF DRAWINGS

In order to describe the embodiments of the present disclosure or the technical solution in the prior art more clearly, the accompanying drawings needed for describing the embodiments or the prior art will be briefly introduced in the following. Apparently, the accompanying drawings described below illustrate merely some embodiments of the present disclosure, and persons of ordinary skill in the art may still derive other drawings from these accompanying drawings without creative effort.

DESCRIPTION OF REFERENCE NUMERALS

20—electrode;
21—welding zone;
211—line-shaped welding mark;
30—tab.

DESCRIPTION OF EMBODIMENTS

With the popularization of portable electrical devices, people pay more and more attention to the safety performance of the portable electrical devices, especially the safety performance of lithium-ion batteries in the portable electrical devices. At present, tabs and electrodes of lithium-ion batteries are usually welded together by adopting an ultrasonic welding process. In a specific implementation, ultrasonic welding requires a welding head to contact with a tab side and apply pressure and vibration so that the tab and the electrode can be welded together. In this process, the welding head will be worn, which on the one hand is easy to lead to a pseudo welding or over welding between the tabs and electrodes and then affect the performance of the battery; on the other hand, the welding head requires to be replaced regularly, thereby increasing the workload of staffs.

Figure 1:
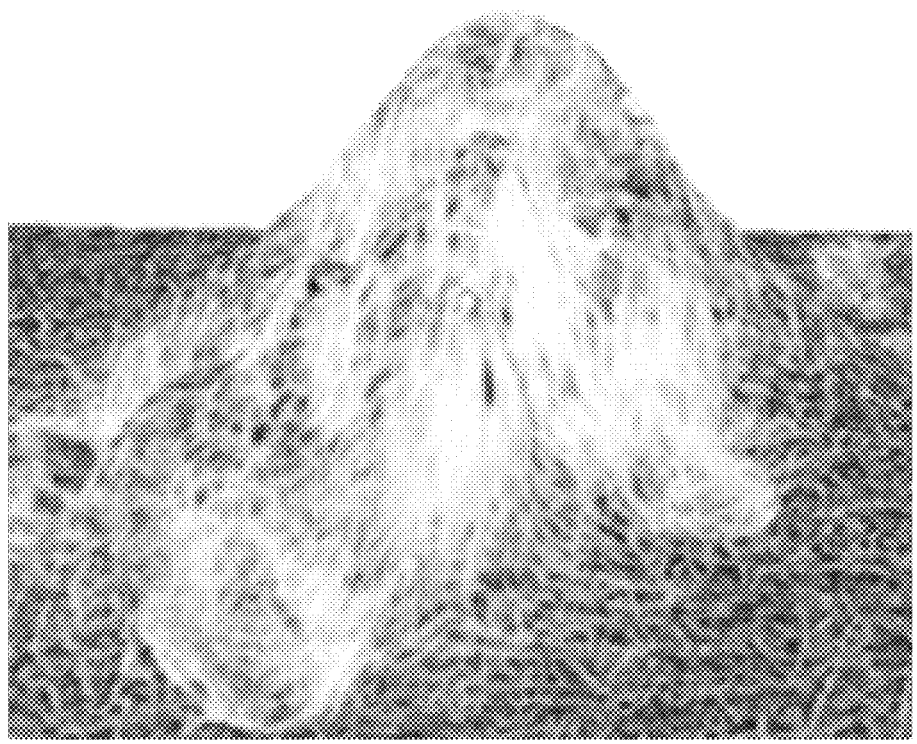
FIG. 1 is a microscopic view of a needle-shaped welding protrusion formed on an electrode side after ultrasonic welding in the prior art.

Generally, after the ultrasonic welding is completed, a sharp needle-shaped welding protrusion will be formed on the electrode side, as shown in FIG. 1. On the one hand, a contact area of the needle-shaped welding protrusion with a separator which is between a positive electrode and a negative electrode is only an area at an apex of the needle-shaped welding protrusion, leading to that pressure between the needle-shaped welding protrusion and the separator is relatively large and the needle-shaped welding protrusion is likely to be pierce the separator; on the other hand, a height of the needle-shaped welding protrusion may reach 80 μm, which further leads to that the needle-shaped welding protrusion is likely to pierce the separator, resulting in a short circuit contact between the positive electrode and the negative electrode, which may cause serious safety problems.

In order to solve the above technical problems, the present disclosure provides a battery, where the electrode and the tab of the battery cell are welded together by a laser welding process, and the laser welding process is a method of welding the electrode and the tab from the electrode side by using a laser beam with high energy density as a heat source. Laser welding does not have the problem of welding head wear, so there is no problem of pseudo welding or over welding caused by welding head wear, and no problem of increased workload caused by welding head replacement either. At the same time, a contact area between a line-shaped welding mark formed after laser welding and a separator is the whole continuous top of the line-shaped welding mark, which is obviously larger than the contact area between the needle-shaped welding protrusion and the separator in the prior art, so the pressure between the line-shaped welding mark and the separator is lower. Moreover, a height of the line-shaped welding mark is less than 30 μm, so that the line-shaped welding mark is less likely to pierce the separator between the positive electrode and the negative electrode to cause a short circuit, which is beneficial to the improvement of the quality and safety performance of the battery.

To make the purpose, technical solution and advantage of the embodiments of the present disclosure clearer, the technical solutions in embodiments of the present disclosure will be described clearly and comprehensively below with reference to the accompanying drawings in embodiments of the present disclosure. Apparently, the described embodiments are merely part rather than all of embodiments of the present disclosure. All other embodiments obtained by those skilled in the art based on the embodiments of the present disclosure without creative effort shall fall within the protection scope of the present disclosure.

First Embodiment

Figure 2:
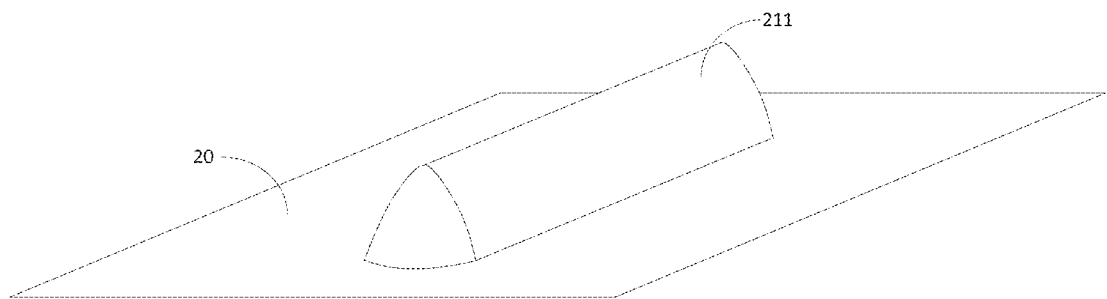
FIG. 2 is a structural schematic diagram of a line-shaped welding mark formed after an electrode and a tab of a battery are welded according to a first embodiment of the present disclosure.
Figure 3:
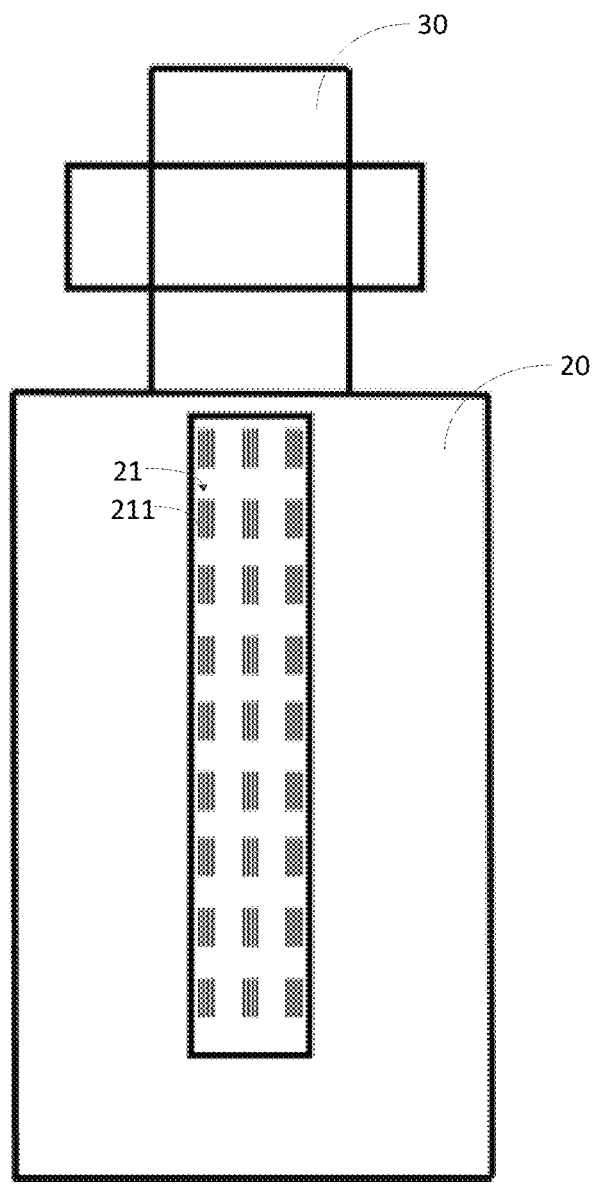
FIG. 3 is a structural schematic diagram of an electrode side after the electrode and the tab of the battery are welded according to the first embodiment of the present disclosure.
Figure 4:
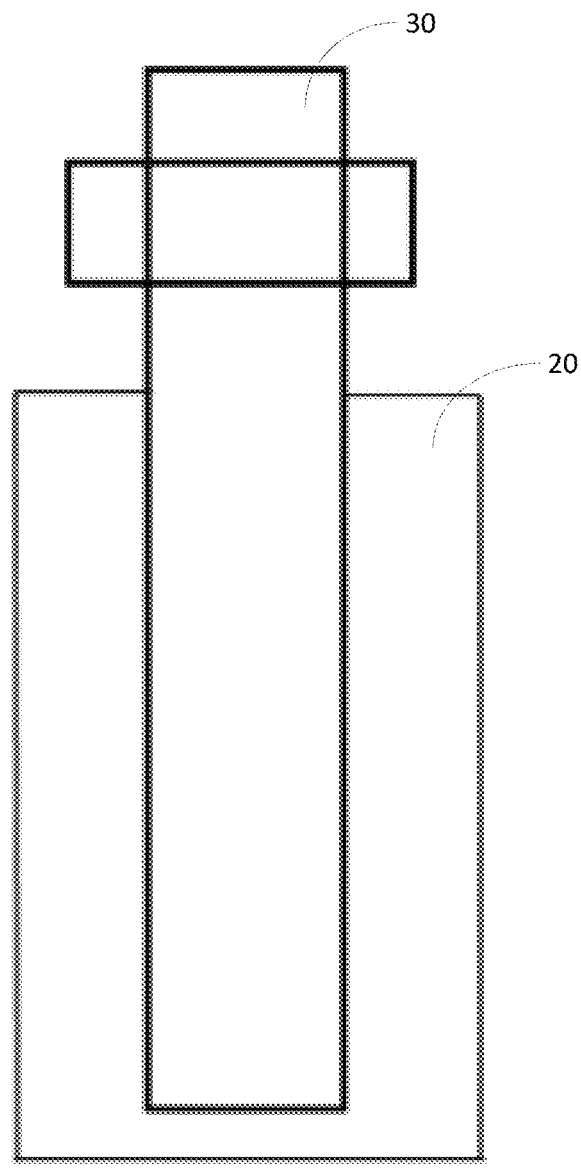
FIG. 4 is a structural schematic diagram of a tab side after the electrode and the tab of the battery cell are welded according to the first embodiment of the present disclosure.
Figure 5:
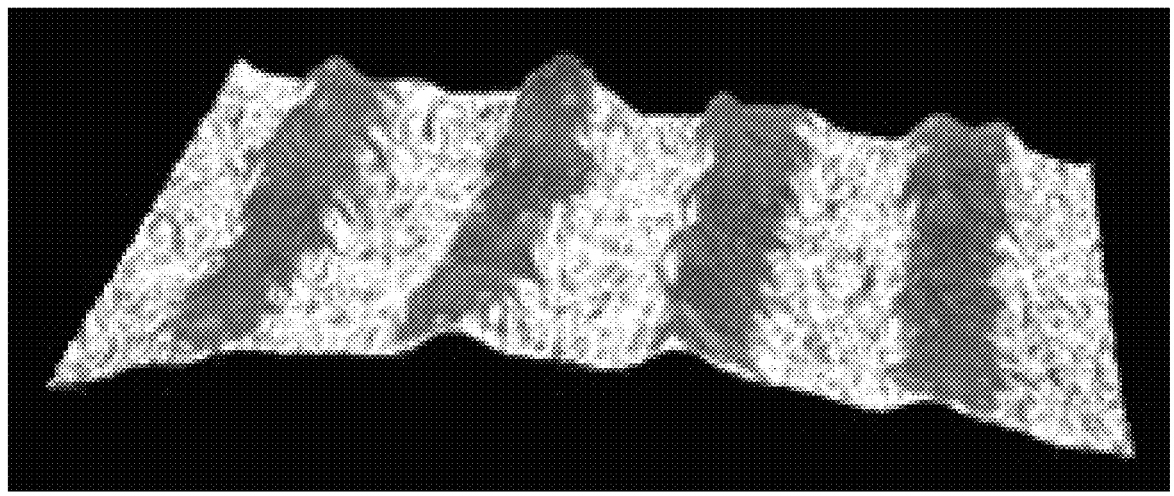
FIG. 5 is a microscopic view of line-shaped welding marks formed after the electrode and the tab of the battery are welded according to the first embodiment of the present disclosure.

FIG. 2 is a cross-sectional view of a line-shaped welding mark formed after an electrode and a tab of a battery are welded according to a first embodiment of the present disclosure; FIG. 3 is a structural schematic diagram of an electrode side after the electrode and the tab of the battery are welded according to the first embodiment of the present disclosure; FIG. 4 is a structural schematic diagram of a tab side after the electrode and the tab of the battery cell are welded according to the first embodiment of the present disclosure; FIG. 5 is a microscopic view of the line-shaped welding mark formed after the electrode and the tab of the battery are welded according to the first embodiment of the present disclosure.

Referring to FIG. 2 to FIG. 5, the present embodiment provides a battery, which includes a housing and a battery cell disposed in the housing, where the battery cell may be a wound battery cell or a laminated battery cell.

Specifically, the wound battery cell includes a positive electrode, a negative electrode and a separator separating the positive electrode from the negative electrode; a positive tab is welded on the positive electrode and a negative tab is welded on the negative electrode; in a winding process, the positive electrode, the separator and the negative electrode are wound in the same direction from the winding head and finally form a wound battery cell.

The laminated battery cell includes a positive electrode, a negative electrode and a separator separating the positive electrode from the negative electrode; a positive tab is welded on the positive electrode and a negative tab is welded on the negative electrode; the positive electrode and the negative electrode are alternately stacked during the processing, and the separator is stacked between two adjacent positive electrode and negative electrode, and finally stacked to form a laminated battery.

In the present embodiment, the battery cell includes electrodes 20 and tabs 30, and each of the electrodes 20 is connected with a tab 30. Specifically, each of the electrodes 20 includes a current collector and an active material layer, the current collector includes a coating zone coated with the active material layer and an empty foil zone not coated with the active material layer and an end of the tab 30 is welded to the empty foil zone of the electrode 20 by a laser welding process to connect the electrode 20 and the tab 30 together.

The electrode may be either a positive electrode or a negative electrode. The electrode includes a current collector and an active material layer coated on the current collector surface. In order to weld the tab with the current collector, it is necessary to reserve an empty foil zone on the current collector surface which is not coated with the active material layer, or remove the active material layer in some area of the current collector surface to expose the current collector, where the exposed current collector surface is the empty foil zone, while the area covered with the active material layer is the coating zone. Generally, the current collector of positive electrode is aluminum foil, while the current collector of negative electrode is copper foil.

Generally, laser welding is carried out on a surface of the empty foil zone facing away from the tab 30. After laser welding is completed, a plurality of welding zones 21 arranged at intervals are formed on the surface of the empty foil zone facing away from the tab 30, and each of the welding zones 21 includes at least one line-shaped welding mark 211.

The line-shaped welding mark 211 may be, for example, a straight welding mark, a curved welding mark, or a polyline welding mark. Generally, the number and arrangement of the line-shaped welding mark 211 in each welding zone 21 are the same. In other implementations, the number and the arrangement of the line-shaped welding mark 211 in each welding zone 21 may also be set according to actual needs.

Furthermore, the surface of the tab 30 facing away from the empty foil zone has no welding mark. Since laser welding is carried out from the surface of the empty foil zone facing away from the tab 30, the dot welding mark 211 is only formed on the surface of the empty foil zone facing away from the tab 30, while the surface of the tab 30 facing away from the empty foil zone maintains the original surface of the tab 30. That is to say, the original flatness of the surface of the tab 30 facing away from the empty foil zone will not be affected by welding, thus avoiding the formation of unfavorable structures on the surface of the tab 30 during welding.

In a specific implementation, first, an end of the tab 30 and the empty foil zone of the electrode 20 are overlapped and attached. For example, the empty foil zone of the electrode 20 may be tightly attached to the tab 30 by a hold-down fixture or an absorption fixture, so as to avoid the situation that the electrode 20 is welded through due to loose attachment. Then, after setting a process parameter of the laser welding device, the laser welding device performs continuous welding on the tab 30 and the electrode 20 from the surface of the empty foil zone facing away from the tab 30 multiple times, and the continuous welding by the laser welding device may form a line-shaped welding mark 211, which may be, for example, a straight line-shaped welding mark, each time. After the multiple times of continuous welding by the laser welding device have been completed, a plurality of welding zones 21 arranged at intervals may be formed on the side of the electrode 20, and each welding zone 21 includes at least one line-shaped welding mark 211, while there is no welding mark on the surface of the tab 30 facing away from the empty foil zone. In the battery cell, the top of the line-shaped welding mark 211 may contact with the separator between the positive electrode and negative electrode. Since the contact area between the line-shaped welding mark 211 and the separator is larger than that between the needle-shaped welding protrusion and the separator in the prior art, the pressure between the line-shaped welding mark 211 and the separator is lower, and thus the line-shaped welding mark 211 is less likely to pierce the separator between the positive electrode and the negative electrode.

The battery in the present embodiment includes a housing and a battery cell disposed in the housing, where the battery cell includes electrodes 20 and tabs 30, and each of the electrodes 20 is connected with a tab 30; and each of the electrodes 20 includes a current collector and an active material layer, the current collector includes a coating zone coated with the active material layer and an empty foil zone not coated with the active material layer, and an end of the tab 30 is welded to the empty foil zone of the electrode 20 by a laser welding process, which could, on the one hand, avoid the occurrence of the phenomenon that the performance of the battery is influenced by pseudo welding or over welding caused by welding head wear during the ultrasonic welding, and on the other hand, save the work of replacing the welding head and thus reduce the workload of staffs. After the laser welding has been completed, the surface of the empty foil zone of the electrode 20 facing away from the tab 30 may have a plurality of welding zones 21 arranged at intervals, each of which includes at least one line-shaped welding mark 211. Since the contact area between the line-shaped welding mark 211 and the separator is larger than that between the needle-shaped welding protrusion and the separator in the prior art, the pressure between the line-shaped welding mark 211 and the separator is lower, and thus the line-shaped welding mark 211 is less likely to pierce the separator between the positive electrode and the negative electrode, thereby preventing a short circuit between the positive electrode and the negative electrode and then being beneficial to the improvement of the quality and safety performance of the battery. Furthermore, there's no welding mark on the surface of the tab 30 facing away from the empty foil zone, that is, the original flatness of the tab 30 could be maintained unchanged through the surface of the tab 30 facing away from the empty foil zone during the welding process, and therefore the surface of the tab 30 facing away from the empty foil zone could be prevented from forming an unfavorable structure to the separator during the welding process, which is beneficial to the improvement of the quality and reliability of the battery.

Specifically, the height of the line-shaped welding mark 211 is less than 30 μm. However, in the prior art, the height of the needle-shaped welding protrusion formed on the electrode side after the ultrasonic welding reaches more than 80 μm. It can be seen that the line-shaped welding mark 211 in the present embodiment has a smaller height, and is less likely to pierce the separator between the positive electrode and negative electrode, thereby preventing a short circuit between the positive electrode and negative electrode, and then being beneficial to the improvement of the quality and safety performance of the battery.

In order to make a welding effect between the electrode 20 and the tab 30 better, it is usually necessary to set the ratio of the height of the line-shaped welding mark 211 to the width of the line-shaped welding mark 211 to be less than 1, that is, the height of the line-shaped welding mark 211 is less than the width of the line-shaped welding mark 211. In a specific implementation, the height of the line-shaped welding mark 211 is relatively low, so that the probability that the line-shaped welding mark 211 pierces the separator between the positive electrode and the negative electrode is relatively low, thereby being beneficial to the improvement of the quality and safety performance of the battery; the width of the line-shaped welding mark 211 is relatively wide, which is beneficial to ensuring that the welding strength between the electrode 20 and the tab 30 could meet the requirement.

Specifically, the width of the line-shaped welding mark 211 may be set to be larger than 50 μm, so that the effective area of the welding connection between the electrode 20 and the tab 30 is relatively large. On the one hand, welding strength between the electrode 20 and the tab 30 could meet a requirement, and on the other hand, efficiency of power transmission between the electrode 20 and the tab 30 could be improved.

In other implementations, the width of the line-shaped welding mark 211 may be set to be less than or equal to 50 μm according to actual needs, as long as the requirement on the welding strength between the electrode 20 and the tab 30 of the present embodiment can be achieved, which are not repeated herein.

Further, the welding zone 21 on the surface of the empty foil zone of the electrode 20 may include at least two line-shaped welding marks 211. In a specific implementation, two line-shaped welding marks 211, three line-shaped welding marks 211 or more line-shaped welding marks 211 may be disposed within a welding zone 21 according to actual needs.

In an implementation, as shown in FIG. 3, at least two line-shaped welding marks 211 may be disposed parallel to each other, and a distance between two adjacent line-shaped welding marks 211 is larger than 50 μm. When a space between two adjacent line-shaped welding marks 211 is too narrow, heat dissipation is poor during welding, thus resulting in heat accumulation and further, oxidation and blackening or even perforation of the electrode, which affects the welding effect between the electrode 20 and the tab 30, and is not beneficial to the quality and safety performance of the battery.

In another implementation, at least two line-shaped welding marks 211 may be disposed to cross with each other, for example, two straight welding marks may cross to form a cross-shaped welding mark according to actual needs; or, a plurality of straight welding marks may be crossed to form a "田" shape according to actual needs; or, two curved welding marks may be crossed and disposed into any shape according to actual needs; or, the straight welding mark and the curved welding mark may be crossed with each other and disposed in any shape according to actual needs.

It can be understood that the arrangement of the at least two line-shaped welding mark 211 in the welding zone 21 includes but is not limited to the above two arrangements, and other arrangements may be set according to actual needs during the specific implementation, which will not be repeated herein.

Referring to FIG. 3, in an implementation, a plurality of welding zones 21 may be arranged in an array on the side of the electrode 20. In a specific implementation, the number of rows and columns of the welding zones 21 can be set according to actual needs, as long as the electrode 20 and the tab 30 can be welded firmly to ensure a good power transmission effect between the electrode 20 and the tab 30, which is not particularly limited herein.

In other implementations, the arrangement of the plurality of welding zones 21 on the side of the electrode 20 may also be adjusted according to actual needs, as long as the requirements of this embodiment can be met, which will not be repeated herein.

In order to prevent a laser for welding from impacting the coating zone of the electrode 20 during the laser welding process and affecting the active material layer of the electrode 20, a minimum distance between the line-shaped welding mark 211 and the coating zone is set to be larger than 1 mm in the present embodiment, so as to avoid accidentally damaging the active material layer of the electrode 20 during the welding process, which is further beneficial to ensuring that the quality of the battery is not affected.

Generally, the empty foil zone is located at the head or tail of the current collector of the electrode. When the tab 30 is welded with the empty foil zone of the electrode 20, the tab 30 is located at the head or tail of the electrode 20. In order to ensure the efficiency of electric energy transmission between the electrode 20 and the tab 30, the empty foil zone of the electrode 20 may also be set in the middle of the electrode 20, and part of the active material layer in the middle of the electrode 20 may be removed to form the empty foil zone. For example, in a wound battery cell, the empty foil zone may be disposed at the middle position of the electrode of the wound battery cell along a length direction. For another example, in a laminated battery cell, the empty foil zone may extend outward from the middle position of the electrode of the laminated battery cell. At this time, after the tab 30 is welded and connected with the empty foil zone of the electrode 20, the tab 30 could be located in the middle of the electrode 20, which is beneficial to the improvement of the power transmission efficiency between the tab 30 and the electrode 20.

Referring to FIG. 4, in the present embodiment, there is no welding mark on the surface of the tab 30 facing away from the electrode 20, that is, the tab 30 and the electrode 20 are weld together by laser welding from the side of the electrode 20. Therefore, the line-shaped welding mark 211 is only formed on the side of the electrode 20, and the original surface of the tab 30 is maintained on the side of the tab 30, that is, the original flatness of the surface of the tab 30 facing away from the electrode 20 may not be affected by welding, thereby being beneficial to avoiding that the surface of the tab 30 forms an unfavorable structure to the separator during the welding process.

The present embodiment also provides a method for manufacturing a battery, where the battery includes a housing and a battery cell, and the battery cell includes electrodes and tabs, and the method includes:

for each pair of an electrode and a tab, overlapping an end of the tab with an empty foil zone of the electrode; performing, by using a laser welding device, continuous welding on a surface of the empty foil zone facing away from the tab multiple times, where a line-shaped welding mark is formed by the continuous welding of the laser welding each time, a plurality of line-shaped welding marks are located in a plurality of welding zones arranged at intervals, so that each of the welding zones includes at least one line-shaped welding mark; the surface of the tab facing away from the empty foil zone having no welding mark; processing the electrode welded with the tab and a separator together to form the battery cell; and assembling the battery cell into the housing to form the battery.

In a specific implementation, the electrode of the battery cell includes a positive electrode and a negative electrode, and the tab includes a positive tab and a negative tab. First, the empty foil zone of the positive electrode may be attached to the positive tab, for example, the empty foil zone of the positive electrode may be tightly attached to the positive tab by a hold-down fixture or an absorption fixture; then, a parameter of the laser welding device is set, for example, it may be set that the time of continuous welding of the laser welding device does not exceed 0.2 ms each time, etc., and the laser welding device is used to perform the continuous welding on the positive tab and the positive electrode from the side of the positive electrode multiple times, with the total welding time not exceeding 1 s, so that a plurality of welding zones arranged at intervals are formed on the surface of the positive electrode, and each of the welding zones includes at least one line-shaped welding mark. Furthermore, the surface of the tab facing away from the empty foil zone has no welding mark.

Similarly, the empty foil zone of the negative electrode may be attached to the negative tab, and then the laser welding device may be used to perform the continuous welding on the negative tab and the negative electrode from the side of the negative electrode multiple times, with the total welding time not exceeding 1 s, so that a plurality of welding zones arranged at intervals are formed on the surface of the negative electrode, and each of the welding zones includes at least one line-shaped welding mark. Furthermore, the surface of the tab facing away from the empty foil zone has no welding mark.

Then, the positive electrode welded with the positive tab, the negative electrode welded with the negative tab and the separator are processed together to form a battery cell. For example, a wound battery cell may be formed by winding, or a laminated battery cell may be formed by stacking.

At last, the above-mentioned wound battery cell or laminated battery cell is assembled into a housing to form a battery.

After the electrode and the tab of the battery in the present embodiment are welded together by laser welding, measured welding tension between the positive electrode and the positive tab is greater than 25 N, and measured welding tension between the negative electrode and the negative tab is greater than 8 N; besides, after the tension continues to be applied to pull the tab and the electrode apart, the area of the current collector of the electrode remaining on the tab accounts for more than 50% of the area of the whole welding zone.

The process of measuring the welding tension between the tab and the electrode by using a tension meter is as follows: firstly, using adhesive tape to stick the welding zone on the electrode side; then clamping the top of the tab with the upper part of the tension meter, clamping the bottom of the aluminum foil material with the lower part of the tension meter, adjusting the tension display mode to the peak mode, and resetting the tension meter to start the measurement: pressing the "up" button to pull in opposite directions apart at 180 degrees until the tab is separated from the electrode; finally, reading the value displayed by the tension meter and recording it, and meanwhile, taking down the tab and measuring the ratio of the area of the current collector of the electrode remaining on the tab to the total area of the welding zone.

Second Embodiment

The embodiment provides a portable electrical device, which includes a battery.

The portable electrical device in the present embodiment includes a mobile terminal, which may be, for example, a mobile phone, a notebook, a tablet computer, a point of sales (POS) machine, a vehicle-mounted computer, a wearable device, etc.

The battery in the present embodiment has the same structure as the battery according to the first embodiment, and could bring the same or similar technical effects, which will not be repeated herein. For details, please refer to the description of the above embodiment.

In the description of the present disclosure, it should be understood that the orientations or positional relationships indicated by the terms "top", "bottom", "upper" and "lower" (if any) are based on the orientations or positional relationships shown in the accompanying drawings, which are only for the convenience of describing the present disclosure and simplifying the description, rather than indicating or implying that the referred apparatuses or elements shall have a specific orientation, or be constructed and operated in a specific orientation, and thus should not be understood as limiting the present disclosure.

In the description of the present disclosure, it should be noted that, unless otherwise clearly specified and defined, the terms "installation", "interconnection", and "connection" should be understood in a broad sense, for example, they may be a fixed connection or a detachable connection, or an integrated connection; they may be a mechanical connection or an electrical connection; they may be a direct interconnection, or an indirect interconnection through an intermediate medium, and they may be an internal communication between two elements. For persons of ordinary skill in the art, the specific meanings of the above terms in the present disclosure can be understood based on specific situations.

The terms "first", "second", etc. in the specification and claims and the above-mentioned accompanying drawings of the present application are used to distinguish similar objects, and are not necessarily used to describe a specific order or sequence. It should be understood that the number thus used may be interchanged under appropriate circumstances, such that the embodiments of the application described herein for example may be implemented in an order other than those illustrated or described herein.

Finally, it should be noted that the above embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent substitutions to some technical features thereof, without departing from the spirit and scope of the technical solutions of embodiments of the present disclosure.

What is claimed is:

1. A battery, comprising a housing and a battery cell disposed in the housing; wherein
   the battery cell comprises electrodes and tabs, and each of the electrodes is connected with a tab, wherein each of the electrodes comprises a current collector and an active material layer, and the current collector comprises a coating zone coated with the active material layer and an empty foil zone not coated with the active material layer, and an end of the tab is welded to the empty foil zone;
   a surface of the empty foil zone facing away from the tab has a plurality of welding zones which are arranged at intervals, and each of the welding zones comprises at least two line-shaped welding marks which are disposed in parallel with each other, and a distance between two adjacent line-shaped welding marks is larger than 50 μm;
   a surface of the tab facing away from the empty foil zone has no welding mark;
   a ratio of a height of each of the line-shaped welding marks to a width of each of the line-shaped welding marks is less than 1;
   the electrodes of the battery cell comprises a positive electrode and a negative positive electrode, and the tabs comprises a positive tab and a negative tab;
   a welding tension between the positive electrode and the positive tab is greater than 25 N; and/or,
   a welding tension between the negative electrode and the negative tab is greater than 8 N.

2. The battery according to claim 1, wherein a height of the line-shaped welding mark is within 30 μm.

3. The battery according to claim 1, wherein the plurality of welding zones are arranged in an array; and/or, the empty foil zone is located in a middle of the electrode.

* * * * *